United States Patent [19]
Fannin

[11] 3,790,222
[45] Feb. 5, 1974

[54] EMERGENCY RELEASE SYSTEM FOR FLUID PRESSURE BRAKES

[75] Inventor: Richard C. Fannin, Grafton, Ohio

[73] Assignee: The Bendix Corporation, South Bend, Ind.

[22] Filed: July 24, 1972

[21] Appl. No.: 274,137

[52] U.S. Cl.................. 303/9, 137/625.49, 303/52
[51] Int. Cl............................................. B60t 13/10
[58] Field of Search .......... 303/9, 2, 13, 63, 81–82, 303/89, 52, 48, 29, 71; 188/105, 106 P, 106 R, 167, 166; 137/625.49

[56] References Cited
UNITED STATES PATENTS
| | | | |
|---|---|---|---|
| 3,115,371 | 12/1963 | Valentine | 303/71 |
| 3,228,729 | 1/1966 | Schubert | 303/89 |
| 3,166,358 | 1/1965 | Valentine | 303/63 |

Primary Examiner—Duane A. Reger
Assistant Examiner—D. C. Butler
Attorney, Agent, or Firm—Ken C. Decker; William N. Antonis

[57] ABSTRACT

In a fluid pressure vehicle brake system of the type having a spring-applied fluid pressure released brake actuator and including conventional service and emergency reservoirs of fluid pressure and wherein the brake actuator is automatically spring-applied upon reduction of service pressure to a predetermined value, the provision of a single manually operable valve for selectively controlling the application of fluid pressure to and from the brake actuator under normal parking conditions and for releasing a spring brake emergency actuation of the actuator when the pressure in the service reservoir drops to the predetermined value.

11 Claims, 2 Drawing Figures

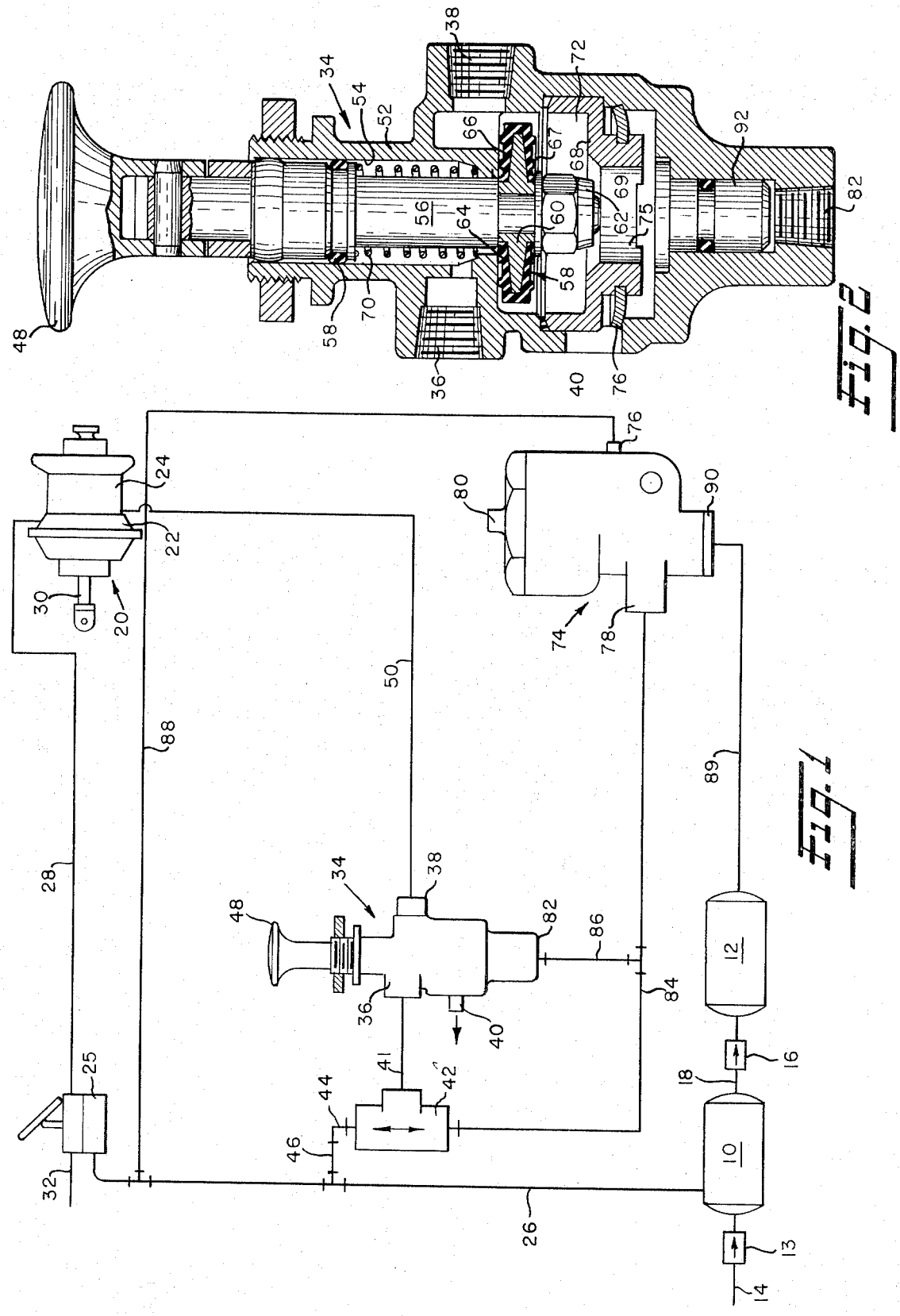

EMERGENCY RELEASE SYSTEM FOR FLUID PRESSURE BRAKES

DESCRIPTION OF THE INVENTION

Fluid pressure vehicle braking systems of the type including spring-applied fluid pressure released brake actuators heretofore provided have for the most part, been satisfactory in operation in providing effective vehicle braking for parking purposes and in also enabling an automatic emergency spring brake application in the event that the service reservoir pressure drops to a value below a safe limit. It is highly desirable however, to provide some means whereby an emergency spring brake application may be readily released without the delay required to restore the service reservoir pressure to a value sufficient to effect a release of such emergency application. In the prior systems, while some provision has been made to secure the release of the brake actuator under the above conditions, the prior arrangements have required the use of a plurality of manually operable valves which is not only confusing to the vehicle operator but also involved the utilization of mounting space on the vehicle dashboard where such space is already at a premium.

It is accordingly the principal object of the present invention to provide a vehicle fluid pressure braking system of the type including spring-applied fluid pressure released actuators which will be so constructed and arranged as to avoid the above difficulties.

Another object is to provide in a fluid pressure braking system of the foregoing type, a novel construction which permits the selective release of a spring brake application even though the service pressure remains at a relatively low pressure which would be ineffective to release the spring brake.

Still another object relates to the provision of a single manually operable valve in a system of the above character for releasing an emergency spring brake application.

Other objects and novel features of the invention will appear more fully hereinafter from a consideration of the following detailed description when taken in connection with the accompanying drawing illustrative of a preferred form of the invention. It will be expressly understood, however, that the drawing is utilized for purposes of illustration only and is not to be taken as a definition of the limits of the invention, reference being had for this purpose to the appended claims.

In the drawing, wherein similar reference characters refer to similar parts throughout the several views:

FIG. 1 is a diagrammatic view of a fluid pressure braking system embodying the principles of the present invention, and FIG. 2 is a sectional view of the novel control valve utilized in the system of FIG. 1.

The novel fluid pressure braking system of the present invention is illustrated in FIG. 1 and for purposes of simplicity, the conduit connections between the various components have been shown as single lines. More particularly, conventional service and emergency fluid pressure reservoirs 10 and 12 are serially connected with a compressor supply line 14 through check valve 13 and a second check valve 16 is interposed in the connection 18 between the reservoirs. A spring-applied fluid pressure released brake actuator 20 of conventional construction includes a service actuator portion 22 and a spring actuated portion 24 and a manually operable brake valve 25 is connected by conduits 26 and 28 to the portion 22 in order to control the application of fluid pressure to and from the service portion 22 during normal braking of the vehicle. As shown, the actuator 20 is arranged to control a rear brake of the vehicle through a push rod 30 and a conduit 32 is connected with the brake valve 25 for controlling the front brake actuators.

In order to control the application and release of the actuator 20 during normal vehicle parking brake operations, the invention provides a novel manually operable control valve 34 provided with a supply port 36, a delivery port 38 and an atmospheric exhaust port 40, the supply port being connected through a conduit 41 and conventional double check valve 42 with the service reservoir 10 by way of conduits 44, 46 and 26. The control valve 34 is provided with a manually operable knob 48 and the construction of the valve 34 is such that when the knob 48 is pushed inwardly, the supply port 36 is connected with the delivery port 38 while outward movement of the knob disconnects the delivery port 38 from the supply port 36 and connects the former with the exhaust port 40. Thus, when the knob 48 is moved inwardly, the service reservoir 10 is connected with the spring brake portion 24 of the actuator 20 by way of conduits 26, 46 and 44, double check valve 42, conduit 41, valve 34 and a conduit 50. Service reservoir pressure admitted to the portion 24 will therefore maintain the actuator 20 in a brake release position. On the other hand, when the knob 48 is moved outwardly to connect the delivery port 38 with the exhaust port 40, the fluid pressure in conduit 50 and portion 24 will be exhausted to atmosphere to permit a spring parking brake application of the actuator 20.

Referring now to FIG. 2, the novel two-position control valve 34 is illustrated therein as including a casing 52 provided with the supply, delivery and exhaust ports 36, 38 and 40 and also provided with a bore 54 for slidably receiving a valve plunger 56 having an O-ring seal 58. The lower end of the plunger 56 carries a valve member 58 of rubbery material having an inlet valve on its upper face, and an exhaust valve on its lower face, the valve member being carried by a valve insert 60 secured to the plunger 56 by a nut 62. The inlet valve is constituted by an annular bead 64 adapted to contact a seat 66 on the casing 52 while the exhaust valve is formed by an annular bead 67 adapted to contact a seat 68 formed on member 69. A spring 70 is confined between a portion of the casing 52 and the plunger 56 and constantly tends to urge the plunger upwardly to maintain the inlet valve 64 closed on its seat 66. When closed, the area of the annular bead 64 is less than the area of the ring 58 so that when the valve 34 is in the closed position of FIG. 2, the valve will remain closed even though the pressure at the port 36 rises to full reservoir pressure. The valve may however, be manually moved to its lower position where the exhaust valve 67 engages the seat 68 in which event it will remain in such position provided the pressure within chamber 72 above the valve 58 is above a predetermined pressure. This is due to the area of the exhaust valve bead 67 which is considerably larger than the bore 54. Hence the valve 34 is pressure responsive by reason of the pressure acting on the upper surface thereof over the area of the exhaust valve bead 67 to maintain the valve closed against the force effective on the ring 58 and the force of the spring 70 until the fluid pressure in the chamber 72 drops to a predetermined minimum, whereupon the spring 70 moves the valve to the exhaust position shown. In such position the delivery port 38 is connected with the exhaust port 40 by way of chamber 72, port 75 in the member 69 and resilient check valve 76. Thus upon a reduction of pressure in the service reservoir 10 of FIG. 1 and hence at the supply port 36 to approximately 35 psi, the valve will automatically shift to the exhaust position, thereby exhausting the spring brake portion of the actuator 20 and allowing an emergency spring brake operation thereof. When this occurs and with the system thus far described, a release of the spring brake application could not be achieved until the pressure in the service reservoir 10 is restored to a value higher than that to which it had initially been reduced. The present invention provides a construction whereby a spring brake application may be readily released regardless of a continued low pressure condition in the service reservoir.

In order to secure the foregoing desirable operation, the present invention provides an arrangement for supplying fluid pressure from the isolated emergency reservoir 12 to the supply port 36 of the control valve 34 and for also ensuring emergency spring brake operation of the actuator 20 upon reduction of service pressure to a predetermined value. As shown, such arrangement includes an inversion valve 74 of conventional construction such as, for example, as shown at 106 in the U.S. Pat. to Frank R. Schubert No. 3,228,729 granted Jan. 11, 1966. The valve 74 is responsive to pressures above a predetermined pressure at its control port 76 to connect its delivery port 78 with an atmospheric exhaust port 80. As shown, this action also connects the double check valve 42 and a pilot inlet port 82 of the valve 34 with the atmosphere by way of conduits 84 and 86 and the inversion valve 74. Since the control port 76 of the valve 74 is connected with the service reservoir 10 by way of the conduit 26 and a conduit 88, it will be readily understood that when the service reservoir is at its normal pressure, the valve 74 will respond thereto and the system will operate as heretofore described. However, when the service reservoir pressure drops to said predetermined value due to leakage of fluid pressure from the service system, for example, the inversion valve 74 will be spring-operated to disconnect the conduit 88 from the exhaust port 80 and connect the former with the emergency reservoir 12 by way of conduit 89 and supply port 90 of the inversion valve 74. In this connection, it will be noted that the emergency reservoir 12 is isolated from the service reservoir 10 by the check valve 16, thus ensuring that any reduction in pressure in the service reservoir will have no effect on the pressure in the emergency reservoir. When the foregoing occurs, and referring to FIG. 2, and bearing in mind that the system is in its normal operating condition where the knob 48 is pressed inwardly to charge the spring brake portion 24 with service pressure to release the actuator 20, fluid pressure from the emergency reservoir 12 will be supplied to the supply port 36 of the valve 34 as soon as the pressure at the control port 76 drops to a predetermined value, as for example, 40 psi. Such pressure is delivered from the emergency reservoir 12 to the supply port 36 by way of conduit 88, valve 74, conduit 84 and double check valve 42.

Means are also provided for ensuring an emergency application of the control valve 34 when the inversion valve 74 responds to the reduction of service pressure as above described. As shown, FIG. 2, such means includes a pilot piston 92 housed in the lower portion of the casing 52 of the inversion valve 34, and positioned to engage the lower end of the plunger 56 and move the same together with valve 58 upwardly in response to the pressure at the pilot inlet port 82. Such upward movement will continue until the inlet valve 64 engages the seat 66 due to the action of the spring 70 and the emergency reservoir pressure now present at the supply port 36 and acting upwardly on the seal 58. The valve 34 is thus automatically moved to the position shown in FIG. 2 and maintained in such position in order to connect the spring brake portion 24 with the exhaust port 40 by way of conduit 50, delivery port 38, chamber 72 of the valve 34, passage 75 and the check valve 76. Hence, an emergency spring brake application of the actuator 20 is assured when the inversion valve operates as aforesaid in response to a reduction in service pressure to said predetermined value.

Under the above conditions, the emergency spring brake application may be readily released regardless of the continued low pressure or lack of pressure existing in the service reservoir. Thus, the operator merely moves the knob 48 downwardly to overcome the force of the pilot piston 92 and move the exhaust valve 67 into engagement with the seat 68. With the knob thus held in this position, emergency reservoir pressure will be conducted from the supply port 36 to the spring brake portion 22 to effect a release of the emergency spring brake application. It will be understood that when the service system failure is repaired and system pressure is restored to the normal value of 120 psi, for example, the inversion valve 74 will operate to exhaust the alternate supply of fluid pressure to the ports 36 and 82 of the control valve 34 when the pressure at the control port 76 of valve 74 rises to approximately 50 psi. Thus, when the valve 74 moves to the exhaust position, the knob 48 may be moved downwardly to remain in such position to recharge the portion 22 to effect a release of the spring brake application. Hence the system is restored to its normal condition where the valve 34 may be operated to control the action of the actuator 20 in effecting spring brake application and release for vehicle parking purposes.

It is believed that the operation of the invention will be clear from the above which sets forth in detail the construction and relationship of the various components of the novel system.

From the foregoing it will be readily appreciated that the invention provides a novel control system for vehicle brake systems where it is desirable to release an emergency spring brake application while retaining full control of the spring brake actuator under normal pressure conditions for purposes of vehicle parking. These combined functions are secured through the use of a single manually operable valve thus conserving premium dashboard space, it being appreciated that the inversion valve 74 which is automatically operable, may be mounted at any desired location in the system.

While the invention has been shown and described herein with considerable particularity, it will be understood that the scope thereof is to be determined by the appended claims.

What is claimed is:

1. In a fluid pressure vehicle brake system including service and emergency fluid pressure reservoirs, a spring-applied fluid pressure released brake actuator and a manually operable valve movable to one position to connect said service reservoir with said actuator to release the latter and movable to a second position to exhaust fluid pressure from said actuator to allow spring brake application of the latter, the improvement which comprises valve means operable in response to a reduction in service reservoir pressure to a predetermined value for simultaneously connecting the emergency reservoir with the manually operable valve, said latter valve including a pressure responsive part subjected to emergency reservoir pressure for positively moving said manually operable valve to said second position when the latter occupies said one position.

2. A fluid pressure vehicle brake system as set forth in claim 1 wherein said manually operable valve includes a fluid pressure supply port normally connected with the service reservoir and a pilot port, said valve means simultaneously connecting the emergency reservoir with said supply port and said pilot port when the service reservoir pressure is reduced to a predetermined value.

3. A fluid pressure vehicle brake system as set forth in claim 2 wherein the fluid pressure supply port is connected with the service reservoir and said valve means through a double check valve.

4. A fluid pressure vehicle brake system as set forth in claim 2 wherein said manually operable valve includes in addition, a delivery port and an exhaust port and said valve is movable to said one position to connect the supply and delivery ports to supply fluid pressure from the service reservoir to the actuator and is movable to said second position to connect said actuator with said exhaust port, said valve including a pressure responsive member subject to fluid pressure at said pilot port for positively moving said valve from said one position to said second position.

5. A fluid pressure vehicle brake system as set forth in claim 4 wherein said valve is manually movable to said first position against the force exerted by said pressure responsive member to connect said actuator with the emergency reservoir.

6. A fluid pressure vehicle brake system as set forth in claim 5 wherein said valve includes pressure responsive means for releasably maintaining the valve in said second position.

7. A fluid pressure vehicle brake system as set forth in claim 1 wherein said manually operable valve includes a supply port, a delivery port, an exhaust port and a pilot inlet port, means including a double check valve for connecting said supply port with the service reservoir or with the valve means, means connecting the delivery port with the actuator, said valve also including a piston subjected to fluid pressure at said pilot inlet port for moving said valve away from said one position toward second position, and pressure responsive means subject to fluid pressure from the emergency reservoir upon operation of said valve means for maintaining the valve in said second position.

8. A fluid pressure vehicle brake system as set forth in claim 7 wherein said valve is manually movable to said first position against the force exerted by said piston to connect the actuator and said supply port.

9. A fluid pressure vehicle brake system as set forth in claim 1 wherein said manually operable valve comprises a casing having supply, delivery, exhaust and pilot inlet ports and being provided with spaced-apart axially aligned upper and lower bores, said casing having a chamber positioned between said bores and said lower bore being connected with the exhaust port, a valve plunger provided with an upper piston member and a lower end, said piston member slidably mounted in said upper bore, a valve element carried by the plunger and positioned in said chamber, said element having an inlet valve of less effective cross-sectional area than said upper piston member and an outlet valve of greater cross-sectional area than said upper piston member, resilient means tending to constantly move the valve plunger to a position to close the inlet valve, fluid pressure at said supply port constantly acting on said piston member when said inlet valve is closed to maintain the latter in closed position and acting on the area of said outlet valve when the latter is closed to maintain the outlet valve closed as long as the pressure at said supply port is above a predetermined value, and a piston in said casing subject to the pressure at said pilot inlet port for positively engaging the lower end of the valve plunger for moving the plunger and the outlet valve away from its closed position.

10. In a fluid pressure vehicle brake system including service and emergency reservoirs, a fluid pressure brake actuator for controlling vehicle brakes, said actuator being of the type having a control conduit connected thereto and wherein charging of said conduit effects brake-release movement of the actuator and exhausting of said conduit effects brake-application movement of the actuator, the improvement which comprises a manually operable valve movable to one position to connect said service reservoir with said conduit to effect brake-release movement of said actuator and movable to another position to exhaust said conduit to effect brake-application movement of the actuator, and valve means operable in response to a reduction in service reservoir pressure to a predetermined value for simultaneously connecting the emergency reservoir with the manually operable valve, said latter valve including a pressure responsive part subjected to emergency reservoir pressure for positively moving the latter to said another position when the latter occupies said one position.

11. A fluid pressure vehicle brake system as set forth in claim 10 wherein said manually operable valve is provided with a supply port normally connected with said service reservoir and a delivery port connected at all times to said control conduit, said valve means transferring said supply port from the service reservoir to said emergency reservoir when the service pressure is reduced to said predetermined value, said manually operable valve including a pressure responsive member subject to fluid pressure at said pilot port for positively moving said valve from said one position to said another position to connect said delivery port to atmosphere.

* * * * *